(12) United States Patent
Elliott

(10) Patent No.: US 11,068,169 B2
(45) Date of Patent: *Jul. 20, 2021

(54) DATA STORAGE DEVICE AND METHOD FOR MEMORY OPERATION AND ITERATIVE POLLING

(71) Applicant: Western Digital Technologies, Inc., San Jose, CA (US)

(72) Inventor: Mark Elliott, San Diego, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,078

(22) Filed: Dec. 20, 2019

(65) Prior Publication Data

US 2020/0125275 A1    Apr. 23, 2020

Related U.S. Application Data

(63) Continuation of application No. 15/959,773, filed on Apr. 23, 2018, now Pat. No. 10,528,269.

(60) Provisional application No. 62/638,030, filed on Mar. 2, 2018.

(51) Int. Cl.
*G06F 3/06* (2006.01)
(52) U.S. Cl.
CPC .......... *G06F 3/0613* (2013.01); *G06F 3/0653* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| 5,566,351 | A | 10/1996 | Crittenden et al. | |
| 8,904,082 | B1 * | 12/2014 | Brahmadathan | G06F 13/4234 |
| | | | | 711/103 |
| 9,436,397 | B2 * | 9/2016 | Schmier | G06F 12/0246 |

(Continued)

OTHER PUBLICATIONS

International Search Report and Written Opinion from PCT/US2019/014058, dated May 1, 2019, 10 pages.

*Primary Examiner* — Denise Tran
(74) *Attorney, Agent, or Firm* — Morgan, Lewis & Bockius LLP

(57) ABSTRACT

A controller of the data storage system may poll a non-volatile memory component to determine an operational status of the non-volatile memory component after a memory operation has been initiated in the non-volatile memory component. The controller may, in response to determining the operational status of the non-volatile memory component is busy, update a polling interval based on a polling factor. The controller may re-poll the non-volatile memory component to determine the operational status of the non-volatile memory component after expiration of the updated polling interval. The controller may repeat the updating of the polling interval and the re-polling of the non-volatile memory component until the operational status of the non-volatile memory component is determined to be ready or until a predetermined number of iterations of the updating and re-polling have been performed if, in response to the re-polling, the operational status is determined to be busy.

17 Claims, 4 Drawing Sheets

(56) References Cited

U.S. PATENT DOCUMENTS

| | | |
|---|---|---|
| 10,528,269 B2 * | 1/2020 | Elliott .................... G06F 3/061 |
| 2003/0117877 A1 | 6/2003 | Roohparvar |
| 2009/0172213 A1 | 7/2009 | Jayachandran et al. |
| 2013/0254467 A1 | 9/2013 | Parizi |
| 2014/0122786 A1 | 1/2014 | Yoon et al. |
| 2015/0363342 A1 | 12/2015 | Tuers et al. |
| 2016/0259553 A1 | 9/2016 | Buxton et al. |
| 2019/0004702 A1 | 1/2019 | Chen |

* cited by examiner

DATA STORAGE DEVICE AND METHOD FOR MEMORY OPERATION AND ITERATIVE POLLING

CROSS-REFERENCE TO RELATED APPLICATIONS

This application is a continuation application of application Ser. No. 15/959,773, filed on Apr. 23, 2018, now U.S. Pat. No. 10,528,269, which claims the benefit of U.S. Provisional Application No. 62/638,030, filed on Mar. 2, 2018, the entirety of each of which is incorporated herein by reference.

BACKGROUND

While executing memory operations, non-volatile memory components may be polled to determine the operational status of the memory components. If a memory component returns a ready state when polled, a new memory operation may be initiated in the memory component. However, if the memory component returns a busy state when polled, the next memory operation for that memory component must wait to be initiated until the memory component returns a ready state during a subsequent polling operation.

SUMMARY

A system and method of polling a non-transitory memory component is provided. According to some implementations, the method comprises polling a non-volatile memory component to determine an operational status of the non-volatile memory component after a memory operation has been initiated in the non-volatile memory component, in response to determining the operational status of the non-volatile memory component is busy, updating a polling interval based on a polling factor, re-polling the non-volatile memory component to determine the operational status of the non-volatile memory component after expiration of the updated polling interval, and repeating the updating of the polling interval and the re-polling of the non-volatile memory component until the operational status of the non-volatile memory component is determined to be ready or until a predetermined number of iterations of the updating and re-polling have been performed if, in response to the re-polling, the operational status is determined to be busy.

According to some implementations, a data storage device comprises a non-volatile memory and a controller coupled to the non-volatile memory. The controller is configured to: poll a non-volatile memory component to determine an operational status of the non-volatile memory component after a memory operation has been initiated in the non-volatile memory component, in response to determining the operational status of the non-volatile memory component is busy, update a polling interval based on a polling factor, re-poll the non-volatile memory component to determine the operational status of the non-volatile memory component after expiration of the updated polling interval, and repeat the updating of the polling interval and the re-polling of the non-volatile memory component until the operational status of the non-volatile memory component is determined to be ready or until a predetermined number of iterations of the updating and re-polling have been performed if, in response to the re-polling, the operational status is determined to be busy.

According to some implementations, a non-transitory machine-readable medium comprises instructions thereon that, when executed, cause an encoding module to perform a method. In these implementations, the method comprises polling a non-volatile memory component to determine an operational status of the non-volatile memory component after a memory operation has been initiated in the non-volatile memory component, in response to determining the operational status of the non-volatile memory component is busy, updating a polling interval based on a polling factor, re-polling the non-volatile memory component to determine the operational status of the non-volatile memory component after expiration of the updated polling interval, and repeating the updating of the polling interval and the re-polling of the non-volatile memory component until the operational status of the non-volatile memory component is determined to be ready or until a predetermined number of iterations of the updating and re-polling have been performed if, in response to the re-polling, the operational status is determined to be busy.

According to some implementations, a data storage device comprises non-volatile memory, means for polling a non-volatile memory component to determine an operational status of the non-volatile memory component after a memory operation has been initiated in the non-volatile memory component, means for updating a polling interval based on a polling factor in response to determining the operational status of the non-volatile memory component is busy, and means for re-polling the non-volatile memory component to determine the operational status of the non-volatile memory component after expiration of the updated polling interval, wherein the means for updating and the means for re-polling are configured to repeat the updating of the polling interval and the re-polling of the non-volatile memory component until the operational status of the non-volatile memory component is determined to be ready or until a predetermined number of iterations of the updating and re-polling have been performed if, in response to the re-polling, the operational status is determined to be busy.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Systems and methods that embody the various features of the subject technology will be described with reference to the following drawings, in which.

DETAILED DESCRIPTION

Figure 1:
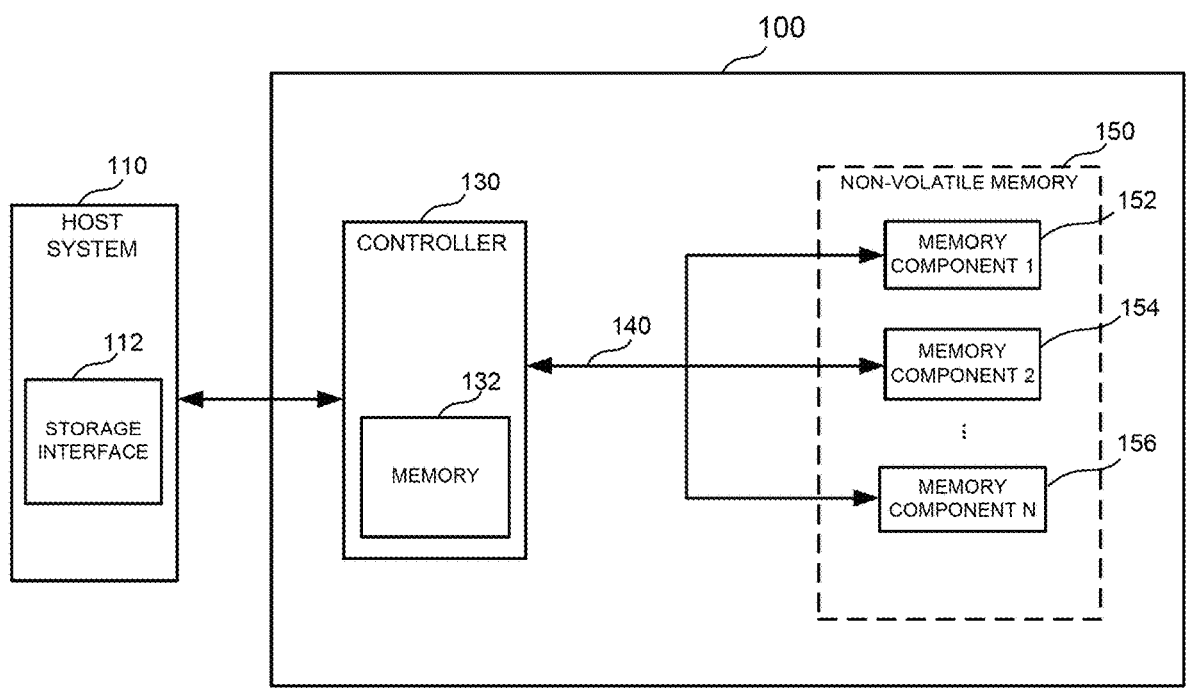
FIG. 1 illustrates an example non-volatile memory system according to aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Non-volatile memory (e.g., flash memory) may perform various memory operations such as reading data from the non-volatile memory, writing data to the non-volatile memory, and erasing data from the non-volatile memory. Before initiating a new memory operation in a non-volatile memory component, a controller may poll the memory component to determine the operational status of the memory component. If the memory component is still executing a previously initiated memory operation, the memory component returns a busy status and the controller must wait before initiating the new memory operation. If the memory component has completed all previously initiated memory operations, the memory component returns a ready status and the controller may initiate the new memory operation.

Data storage devices often include multiple non-volatile memory components for storing data. Multiple memory operations may be executed concurrently in respective memory components to improve the data throughput and latency of the system. However, polling operations used to determine the operational status of the memory components may negatively impact system performance. For example, a data storage device controller may use the same bus for polling operations as used for memory operations. With this arrangement, polling operations occupy the bus and delay memory operations from being initiated or results of the memory operations from being returned to the controller. Accordingly, if the frequency of polling operations is too high, latency of the data storage device may increase beyond acceptable limits. In addition, frequent polling operations may consume a disproportionate amount of power available in the data storage device. Alternatively, if the frequency of polling operations is too low, the accompanying delays in being able to initiate new memory operations and obtain the results from previous memory operations also may increase latency of the data storage device beyond acceptable limits.

Aspects of the subject technology optimize polling operations based on statistics and profiles for periods of time during which non-volatile memory components execute and complete memory operations. These periods of time may be estimated and assumed to have a Gaussian distribution. Each type of memory operation (e.g., read, write, erase) includes an initial period of time during which the operational status always remains busy due to the inherent functions involved in executing the memory operation. After this initial period of time, there is an increasing probability with time that a memory component will return a ready state in response to polling. Accordingly, increasing the frequency of polling based on the distribution optimizes the timing of the polling operations. As will be described in more detail below, aspects of the subject technology use polling profiles that include an initial waiting period during which the operational status will not be ready and a polling factor used to update subsequent polling intervals based on the distribution.

FIG. 1 illustrates an example data storage system 100 according to aspects of the subject technology. As shown, data storage system 100 (e.g., a solid-state drive) includes a controller 130, memory 132, and non-volatile memory 150. The non-volatile memory 150 may comprise multiple memory components (e.g., first memory component 152, second memory component 154, and Nth memory component 156).

Controller 130 may include several internal components (not shown) such as one or more processors, a read-only memory, a flash component interface (for example, a multiplexer to manage instruction and data transport along a connection to non-volatile memory 150), an I/O interface, error correction circuitry, and the like. A processor of controller 130 may monitor and control the operation of the components in data storage controller 130. The processor and/or controller 130 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. In some aspects, one or more elements of controller 130 may be integrated into a single chip. In other aspects, the elements may be implemented on two or more discrete components.

Controller 130 may be configured to execute code or instructions to perform the operations and functionality described herein. For example, controller 130 may be configured to perform operations for managing request flow and address mappings, and to perform calculations and generate commands. One or more sequences of instructions may be stored as firmware on memory within controller 130. One or more sequences of instructions may be software stored and read from memory 132, non-volatile memory 150, or received from host system 110. Memory 132 and non-volatile memory 150 represent examples of machine or computer readable media on which instructions/code executable by controller 130 may be stored. Machine or computer readable media may generally refer to any tangible and non-transitory medium or media used to provide instructions to controller 130, including both volatile media, such as dynamic memory used for memory 132 or for buffers within controller 130, and non-volatile media, such as electronic media, optical media, and magnetic media. The operations and functionality described herein also may be implemented in hardware using logic circuits, for example, or a combination of hardware and software/firmware.

In some aspects, memory 132 represents volatile memory used to temporarily store data and information used to manage data storage system 100. According to aspects of the present disclosure, memory 132 is a random access memory (RAM) such as double data rate (DDR) RAM. Other types of RAM also may be used to implement memory 132. Memory 132 may be implemented using a single RAM module or multiple RAM modules. While memory 132 is depicted as being distinct from controller 130, it is understood that memory 132 may be incorporated into controller 130 without departing from the scope of the present disclosure. Alternatively, memory 132 may be a non-volatile memory such as a magnetic disk, flash memory, peripheral SSD, and the like.

A host interface is configured to couple data storage device 100 to host system 110, to receive data from and send data to host system 110. The host interface may include both electrical and physical connections for operably coupling host system 110 to controller 130. The host interface may be configured to communicate data, addresses, and control signals between host system 110 and controller 130. In this manner, controller 130 is configured to store data received from host system 110 in non-volatile memory 150 in response to a write command from host system 110, and to read data stored in non-volatile memory 150 and to transfer the read data to host system 110 via the host interface in response to a read command from host system 110.

Host system 110 represents any device configured to be coupled to data storage system 110 and to store data in data storage system 100. Host system 110 may be a computing system such as a personal computer, a server, a workstation, a laptop computer, PDA, smart phone, and the like. Alternatively, host system 110 may be an electronic device such as a digital camera, a digital audio player, a digital video recorder, and the like.

Host system 110 and data storage system 100 may be in communication with each other via a bus. The bus may use interface standards including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe). According to some aspects, data storage system 100 may include pins (or a socket) to mate with a corresponding socket (or pins) on host system 110 to establish an electrical and physical connection.

As depicted in FIG. 1, data storage device 100 includes an internal system bus 140. System bus 140 may include a combination of a control/command bus, an address bus, and a data bus, and connect controller 130 to the memory components of non-volatile memory 150. Data may be transferred between the various components over system bus 140. The system bus 140 may reside partially external and partially internal to controller 130.

Controller 130 may be configured to receive data and/or storage access commands from a storage interface 112 (e.g., a device driver) of host system 110. Storage access commands communicated by the storage interface 112 may include read and write commands issued by the host system 110. Read and write commands may specify a logical address (e.g., logical block addresses or LBAs) used to access data stored in the data storage system 100. Controller 130 may execute commands in the non-volatile memory 150 in response to commands received from storage interface 112.

Non-volatile memory 150 may include multiple memory components (e.g., first memory component 152, second memory component 154, and Nth memory component 156). Each memory component represents a non-volatile memory device for storing data. According to aspects of the subject technology, the memory components include, for example, a NAND flash memory. Each memory component may include a single flash memory chip or die, or may include multiple flash memory chips or die. For example, within non-volatile memory 150, some of the memory components may comprise one flash die while others may comprise more than one flash die. The memory components are not limited to any particular capacity or configuration. For example, the number of physical blocks, the number of physical pages per physical block, the number of sectors per physical page, and the size of the sectors may vary within the scope of the subject technology.

The memory components may be arranged in multiple channels, with each channel having one or more memory components. Controller 130 interfaces to one of the memory components via a corresponding channel. Each of the channels (not shown) may be implemented using system bus 140. Each channel allows controller 130 to send read, write and/or erase commands to the corresponding memory component.

The memory components may include a single-level cell (SLC) memory, a multi-level cell (MLC) memory, a three-level cell (TLC) memory device, etc. In some aspects, the non-volatile memory 150 may comprise one or more hybrid memory devices that may function in one or more of a SLC, MLC or TLC mode. Other types of flash memory such as 3D NAND flash memory also are contemplated in the subject technology. The data storage system 100 may further comprise other types of storage.

The controller 130 may be configured to perform a polling operation on the non-volatile memory 150. For example, the controller 130 may be configured to request an operational status from memory components 152, 154, and 156 to receive an operational status from the memory components 152, 154, and 156 in response. The polling operation may include controller 130 reading an operational status from memory components 152, 154, and 156. The controller 130 may perform the polling operation via bus 140 that provides a connection between the controller 130 and the non-volatile memory 150.

According to aspects of the subject technology, a polling profile is defined for actively updating a polling interval to control the timing of polling operations. The polling profile may include four values used to determine a series of polling intervals. For example, the polling profile may include an initial waiting period, an initial polling interval, a polling factor, and a minimum polling interval. These values may be stored registers in controller 130 or read from non-volatile memory 150. Polling profiles may be maintained for different memory operations. For example, a different polling profile may be maintained for each of read memory operations, write memory operations, and erase memory operations. In addition to the different memory operation types, polling profiles may be maintained for different life stages of non-volatile memory 150 measured by metrics such as program/erase cycles.

After initiating a memory operation in one of the memory components, controller 130 initiates a polling operation for the memory component based on the polling profile corresponding to the memory operation. The polling operation may be initiated by controller 130 setting a down counter to the initial waiting period specified by the polling profile. The initial waiting period may correspond to a minimum duration of a memory operation performed by the memory component. For example, the minimum duration of the memory operation may be the minimum amount of time required for the memory component to complete the memory operation. The minimum amount of time may vary for different types of memory operations and for different life stages of the non-volatile memory.

After the down counter expires indicating that the initial waiting period has lapsed, controller 130 polls the memory component to determine the operational status of the memory component. If the memory component returns a busy status, controller 130 sets a polling interval in the down counter to the initial polling interval from the polling profile and polls the memory component again after the down counter expires. If the memory component again returns a busy status, the polling interval is updated based on the polling factor from the polling profile and the down counter is set with the updated polling interval. This updating and polling process is repeated until the operational status of the memory component is determined to be ready or a predetermined number of iterations of the process have occurred indicating an error in the memory operation.

According to aspects of the subject technology, the polling interval may be updated by multiplying the previously set polling interval by the polling factor. If the polling factor is set to a value less than one, polling intervals will decrease with each iteration. For example, the $N^{th}$ updated polling interval corresponding to the Nth iteration may be represented by an equation, where the $N^{th}$ polling interval is equal to the initial polling interval multiplied by (polling factor)$^N$, where N is the number of polling iterations. In such an example, if the polling factor is 0.8, the initial polling interval is multiplied by 0.8'=0.8 for the first iteration of updating the polling interval, by $0.8^2$=0.64 for the second iteration of updating the polling interval, by $0.8^3$=0.512 for the third iteration of updating the polling interval, and by $0.8^N$ for the Nth iteration of updating the polling interval.

In one or more implementations, the initial polling interval and the polling factor may be based on a distribution of periods of time for completing the type of memory operation (e.g., read, write, erase) corresponding to the polling profile. As noted above, the distribution may be estimated and assumed to have a Gaussian distribution. The initial polling interval may be set to the point in time when the distribution indicates a minimum probability of the memory component returning a ready status. A function, such as a logarithmic function, may be fitted to the distribution and the polling factor set in the profile based on the function. For example, the function may be the updated polling interval=current polling interval*(polling factor)$^N$ where N is the iteration number.

The distribution may be determined based on data aggregated over time by maintaining a record of the period of time from initiating a memory operation in a memory component to the memory component returning a ready status in response to a polling operation. The distribution also may be based on simulation or testing results.

After each updating of the polling interval, controller 130 may compare the updated polling interval to the minimum polling interval specified in the polling profile. If the updated polling interval is less than or equal to the minimum polling interval, the polling interval is not updated on any subsequent iterations of polling the memory component. The minimum polling interval is set to prevent the bus between the controller and the memory components from becoming saturated with polling operations as the updated polling interval decreases.

If a polling operation returns a ready status, the controller 130 may stop performing additional polling operations on the memory component and may initiate a new memory operation in the memory component. The controller 130 then restarts the polling process using a polling profile corresponding to the type of memory operation initiated in the memory component.

Figure 2A:
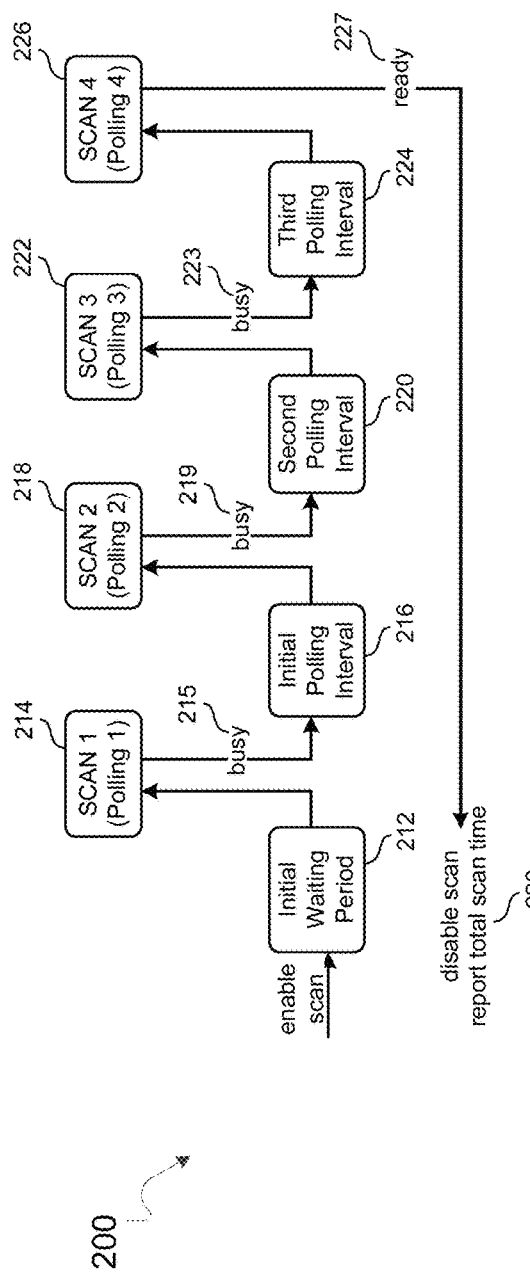
FIG. 2A depicts an example process illustrating polling of a non-volatile memory component, according to one or more implementations.

FIG. 2A depicts an example process 200 illustrating polling of a non-volatile memory component, according to one or more implementations. When the controller 130 initiates polling after a memory operation has been initiated in a memory component, the controller 130 waits for an initial waiting period 212. When the initial waiting period expires, the controller 130 performs a first polling operation 214 to poll the memory component. In response to the first polling operation, the memory component returns a busy status 215. Because the busy status is received, the controller 130 waits for an initial polling interval 216 to perform another polling operation. When the initial polling interval expires, the controller 130 performs a second polling operation 218 to poll the memory component.

In response to the second polling operation, the memory component returns a busy status 219. Because the busy status is received, the controller 130 waits for a second polling interval 220 to perform another polling operation, where the second polling interval is determined by multiplying the initial polling interval by the polling factor from the polling profile. When the second polling interval expires, the controller 130 performs a third polling operation 222 to poll the memory component.

In response to the third polling operation, the memory component returns a busy status 223. Because the busy status is received, the controller 130 waits for a third polling interval 224 to perform another polling operation, where the third polling interval is determined by multiplying the second polling interval by the polling factor. When the third polling interval expires, the controller 130 performs a fourth polling operation 226 to poll the memory component.

In response to the fourth polling operation, the memory component returns the ready status 227 and thus the controller 130 stops polling the memory component and reports a total scan time 228. The total scan time from when the initial waiting period is started to receiving the ready status from the memory component represents the period of time needed for the memory component to complete the memory operation and may be used by controller 130 to update the distribution for the type of memory operation. When the memory component returns the ready status, the controller 130 may initiate another memory operation in the memory component.

As described above, polling intervals are updated by multiplying the previous polling interval by the polling factor. The process of updating the polling interval may be performed or represented in other ways. For example, the polling interval may be updated after each iteration by multiplying the initial polling interval by an updated polling factor, where the updated polling factor is the polling factor raised to the power of the current iteration (e.g., (polling factor)$^N$, where N is the iteration following the first polling of the memory component).

Figure 2B:
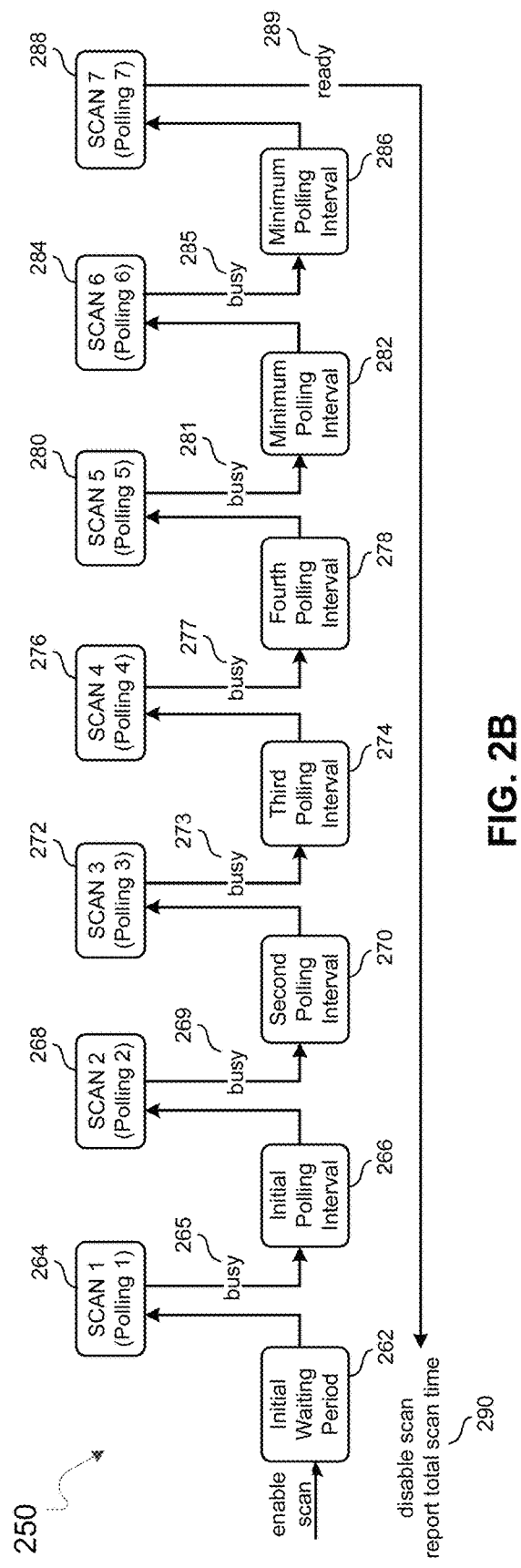
FIG. 2B depicts an example process illustrating polling of a non-volatile memory component, according to one or more implementations.

FIG. 2B depicts an example process 250 illustrating polling of a non-volatile memory component, according to one or more implementations. When the controller 130 initiates polling after a memory operation has been initiated in a memory component, the controller 130 waits for an initial waiting period 262. The processes 264-274 of FIG. 2B are similar to the processes 214-224 of FIG. 2A, and thus the discussion of the processes 264-274 of FIG. 2B is omitted for brevity. When the third polling interval expires, the controller 130 performs a fourth polling operation 276 to poll the memory component.

In response to the fourth polling operation, the memory component returns a busy status 277. Because the busy status is received, the controller 130 waits for a fourth polling interval 278 to perform another polling operation, where the fourth polling interval is determined by multiplying the third polling interval by the polling factor. When the fourth polling interval expires, the controller 130 performs a fifth polling operation 280 to poll the memory component.

In response to the fifth polling operation, the memory component returns a busy status 281. To limit the amount of bandwidth on the bus between controller 130 and the memory components used by polling operations, the updated polling intervals (e.g., second polling interval, third polling interval, etc.) may be compared against a minimum polling interval of the polling profile and set to the minimum polling interval if the updated polling interval is less than or equal to the minimum polling interval. For example, if the fifth polling interval determined by multiplying the fourth polling interval by the polling factor is less than or equal to the minimum polling interval, the fifth polling interval is set to the minimum polling interval. When the fifth polling interval expires, the controller 130 performs a sixth polling operation 284 to poll the memory component.

In response to the sixth polling operation, the memory component returns a busy status 295. Because the busy status is received, the controller 130 waits for a sixth polling interval 282 to perform another polling operation. Because the minimum polling interval is reached as discussed above, the sixth polling interval, and any subsequent polling intervals, is set to the minimum polling interval. When the sixth polling interval expires, the controller 130 performs a seventh polling operation 288 to poll the memory component.

In response to the seventh polling operation, the memory component returns the ready status 289, and thus the controller 130 stops polling the memory component and reports a total scan time 290 as noted above with respect to FIG. 2A. Further, when the memory component returns the ready status, the controller 130 may initiate another memory operation in the memory component.

Figure 3:
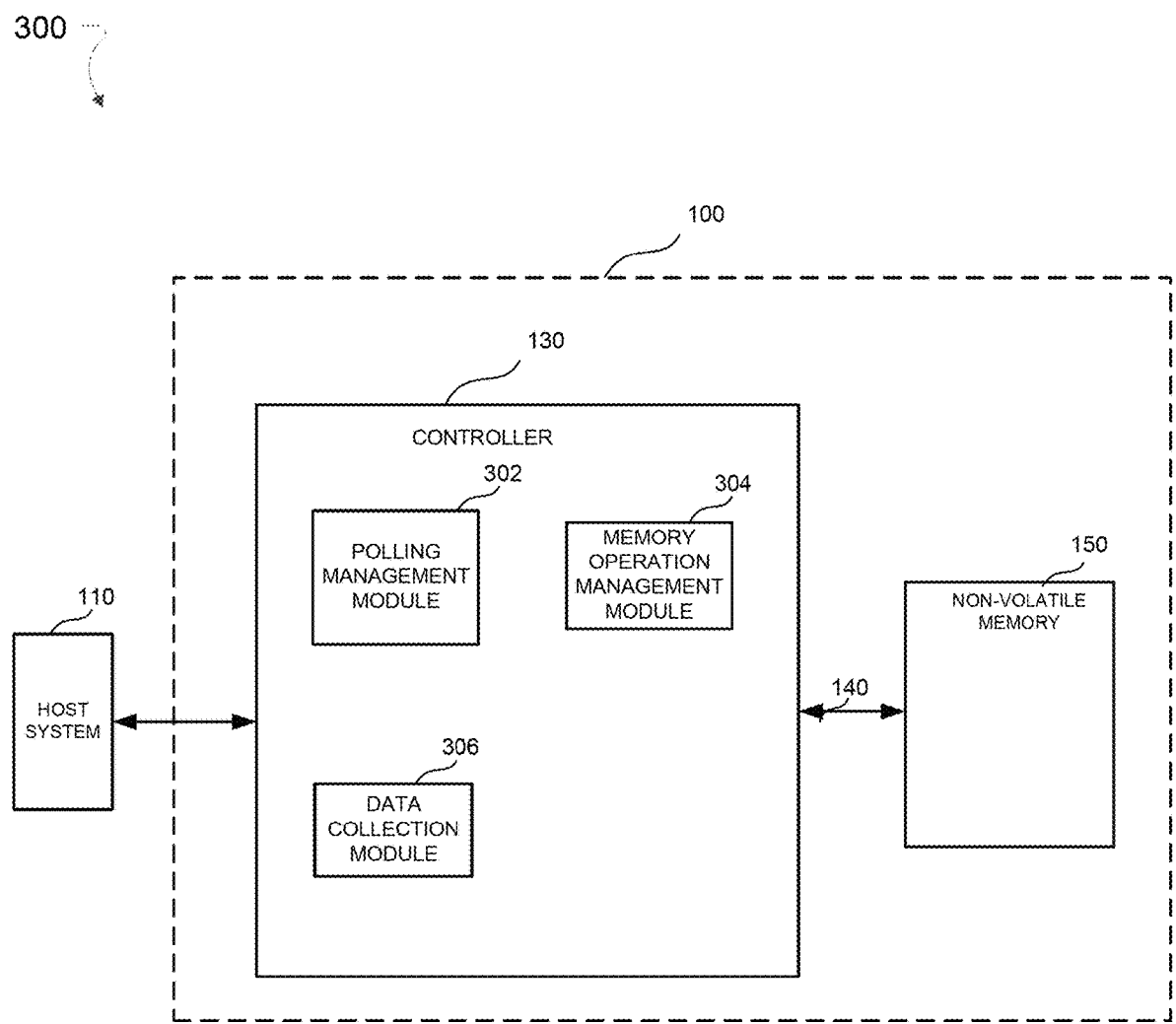
FIG. 3 illustrates example diagram illustrating components included in the controller of the non-volatile memory system according to aspects of the subject technology.

FIG. 3 illustrates example diagram 300 illustrating components of controller 130 of the data storage device 100 according to aspects of the subject technology. The controller 130 may include a polling management module 302, a memory operation management module 304, and a data collection module 306. Each of the modules represents a combination of hardware and software/firmware configured to the functions outlined above. For example, a processor may read and execute one or more sequences of instructions from a memory. Alternatively, hardware logic circuits may be configured to perform the functions outlined above. In yet another alternative, a combination of a processor reading and executing sequences of instructions and hardware logic circuits may perform the functions.

The polling management module 302 is configured to execute the polling operations described above in response to being informed by memory operation management module 304 of a new memory operation being initiated in memory component of non-volatile memory 150. For example, polling management module 302 may set a down counter to the initial polling interval and perform the polling of the non-volatile memory component after the initial waiting period has lapsed. In response to determining the operational status of the non-volatile memory component is busy, the polling management module 302 may update the polling interval based on a polling factor. In some aspects, the initial waiting period may be greater than the polling interval. In one or more implementations, the polling factor may be a value less than one, and the system may update the polling interval based on the polling factor by multiplying the polling interval by the polling factor. The polling management module 302 may re-poll the non-volatile memory component to determine the operational status of the non-volatile memory component after expiration of the updated polling interval.

The polling management module 302 may repeat updating of the polling interval and the re-polling of the non-volatile memory component until the operational status of the non-volatile memory component is determined to be ready or until a predetermined number of iterations of the updating and re-polling have been performed if, in response to the re-polling, the operational status is determined to be busy.

In some aspects, the polling management module 302 may determine that the updated polling interval satisfies an interval threshold (e.g., less than or equal to a minimum polling interval). In such aspects, in response to determining the updated polling interval satisfies the interval threshold, the polling management module 302 may repeat the re-polling of the non-volatile memory component without updating the polling interval.

In one or more implementations, the polling factor may be a value less than one, and wherein updating the polling interval based on the polling factor comprises multiplying the polling interval by the polling factor.

In one or more implementations, the polling factor is based on a distribution of memory operation completion times. In some aspects, the data collection module 306 may maintain and update data representing a distribution of memory operation completion times after a memory component has completed a memory operation and returned a ready status.

Figure 4:
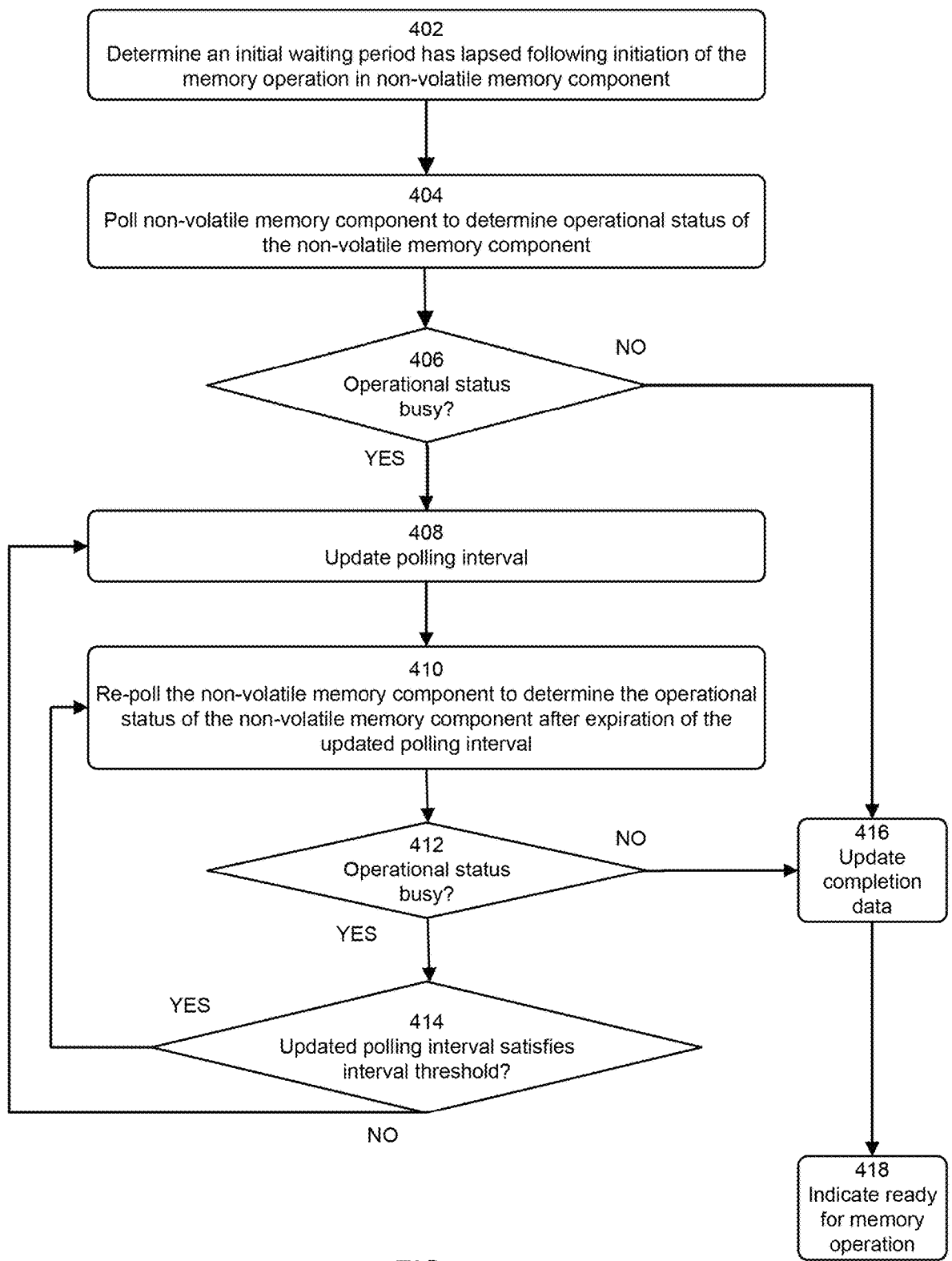
FIG. 4 depicts a flow diagram of an example process for polling a non-volatile memory component according to aspects of the subject technology.

FIG. 4 depicts a flow diagram of an example process 400 for polling a non-volatile memory component according to aspects of the subject technology. For explanatory purposes, the various blocks of example process 400 are described herein with reference to the components and/or processes described herein. The one or more of the blocks of process 400 may be implemented, for example, by one or more processors, including, for example, controller 130 of FIG. 1 or one or more components or processors of controller 130. In some implementations, one or more of the blocks may be implemented apart from other blocks, and by one or more different processors or controllers. Further for explanatory purposes, the blocks of example process 400 are described as occurring in serial, or linearly. However, multiple blocks of example process 400 may occur in parallel. In addition, the blocks of example process 400 need not be performed in the order shown and/or one or more of the blocks of example process 400 need not be performed. The blocks of process 400, or subset thereof, may also be executed for each memory device and/or to support multiple code lengths, depending on various operating conditions of the memory device(s).

In the depicted example, a system according to the subject technology may determine an initial waiting period has lapsed following initiation of the memory operation in the non-volatile memory component (402). In some aspects, the initial waiting period may be based on a type of the initiated memory operation. The system polls the non-volatile memory component to determine an operational status of the non-volatile memory component (404).

The system determines whether the operational status of the memory component is busy based on the polling (406). If in response to the polling, the memory component returns a busy status, the system updates a polling interval based on a polling factor as described above (408). The polling factor may be a value less than one, and the system may update the polling interval based on the polling factor by multiplying the polling interval by the polling factor. The polling factor may be based on a distribution of memory operation completion times. The system re-polls the non-volatile memory component to determine the operational status of the non-volatile memory component after expiration of the updated polling interval (410).

The system determines whether the memory component returns a busy operational status in response the re-polling (412). The system may determine if the updated polling interval satisfies an interval threshold (414). When determining that the updated polling interval satisfies the interval threshold (e.g., and that the operational status of the non-volatile memory component is busy), the system may repeat the re-polling of the non-volatile memory component without updating the polling interval. When determining that the updated polling interval has not satisfied the interval threshold (e.g., and that the operational status of the non-volatile memory component is busy), the system may repeat updating of the polling interval and the re-polling of the non-volatile memory component.

Thus, the system may repeat updating of the polling interval and the re-polling of the non-volatile memory component until the operational status of the non-volatile memory component is determined to be ready or until a predetermined number of iterations of the updating and re-polling have been performed if, in response to the re-polling, the operational status is determined to be busy. If the memory component returns a ready operational status in response to a polling operation, the total scan time representing the completion time of the memory operation may be reported to update data representing the distribution of completion times for the type of the memory operation (416) and the memory component may be indicated as being ready and available for a next memory operation (418).

The systems and methods disclosed herein may be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific example implementations disclosed above may be combined in different ways to form additional example implementations, all of which fall within the scope of the present disclosure. Although the present disclosure provides certain preferred example implementations and applications, other example implementations that are apparent to those of ordinary skill in the art, including example implementations which do not provide all of the features and advantages set forth herein, are also within the scope of this disclosure. Accordingly, the scope of the present disclosure is intended to be defined only by reference to the appended claims.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   non-volatile memory; and
   a controller configured to cause:
      determining an operational status of a memory portion of the non-volatile memory after a memory operation has been initiated in the memory portion, wherein the determining is based on polling the memory portion;
      while the operational status of the memory portion is busy, or until a predetermined number of iterations has occurred while the operational status of the memory portion is busy, performing one or more iterations of the following operations:
         changing a polling interval; and
         re-polling the memory portion to determine the operational status of the memory portion after expiration of the changed polling interval;
      determining that the changed polling interval satisfies a polling interval threshold; and
      repeating the re-polling of the memory portion without changing the polling interval further in response to determining that the changed polling interval satisfies the polling interval threshold.

2. The data storage device of claim 1, wherein the changing the polling interval comprises changing the polling interval based on a polling factor.

3. The data storage device of claim 1, wherein the changing the polling interval comprises changing the polling interval in response to determining that the operational status of the memory portion is busy.

4. The data storage device of claim 1, wherein the controller is configured to cause:
   determining whether an initial waiting period has expired after the memory operation has been initiated in the memory portion; and
   polling the memory portion after the initial waiting period has expired.

5. The data storage device of claim 4, wherein the initial waiting period is greater than the polling interval.

6. The data storage device of claim 2, wherein the polling factor is based on a distribution of memory operation completion times.

7. The data storage device of claim 6, wherein the controller is configured to cause: changing a data table to indicate an iteration of re-polling in response to which the operational status of the memory portion is determined to be ready, wherein the distribution of memory operation completion times is based on the data table.

8. A method, comprising:
   determining an operational status of a memory portion of a non-volatile memory after a memory operation has been initiated in the memory portion, wherein the determining is based on polling the memory portion; and
   while the operational status of the memory portion is busy, or until a predetermined number of iterations has occurred while the operational status of the memory portion is busy, performing one or more iterations of the following operations:
      changing a polling interval; and
      re-polling the memory portion to determine the operational status of the memory portion after expiration of the changed polling interval,
   wherein the changing the polling interval comprises changing the polling interval based on a polling factor, and
   wherein the polling factor is based on a distribution of memory operation completion times.

9. The method of claim 8, wherein the changing the polling interval comprises changing the polling interval in response to determining that the operational status of the memory portion is busy.

10. The method of claim 8, comprising: determining whether an initial waiting period has expired after the memory operation has been initiated in the memory portion, wherein the memory portion is polled after the initial waiting period has expired.

11. The method of claim 10, wherein the initial waiting period is greater than the polling interval.

12. The method of claim 8, comprising: determining that the changed polling interval satisfies a polling interval threshold, wherein the re-polling of the memory portion is repeated without changing the polling interval in response to determining that the changed polling interval satisfies the polling interval threshold.

13. The method of claim 8, comprising: changing a data table to indicate an iteration of re-polling in response to which the operational status of the memory portion is determined to be ready, wherein the distribution of memory operation completion times is based on the data table.

14. A data storage device, comprising:
 means for determining an operational status of a memory portion of a non-volatile memory after a memory operation has been initiated in the memory portion, wherein the means for determining is based on polling the memory portion; and
 while the operational status of the memory portion is busy, or until a predetermined number of iterations has occurred while the operational status of the memory portion is busy, means for performing one or more iterations of the following operations:
  changing a polling interval; and
  re-polling the memory portion to determine the operational status of the memory portion after expiration of the changed polling interval,
 wherein the changing the polling interval comprises changing the polling interval based on a polling factor, and
 wherein the polling factor is based on a distribution of memory operation completion times.

15. The data storage device of claim 14, wherein the changing the polling interval based on the polling factor comprises changing the polling interval, based on the polling factor, in response to determining that the operational status of the memory portion is busy.

16. The data storage device of claim 15, comprising: means for changing a data table to indicate an iteration of re-polling in response to which the operational status of the memory portion is determined to be ready, and wherein the distribution of memory operation completion times is based on the data table.

17. The data storage device of claim 14, comprising:
 means for determining whether an initial waiting period has expired after the memory operation has been initiated in the memory portion; and
 means for polling the memory portion after the initial waiting period has expired.

\* \* \* \* \*